(12) United States Patent
Liebhart

(10) Patent No.: US 8,416,791 B2
(45) Date of Patent: Apr. 9, 2013

(54) LOCAL BREAK OUT IN CASE OF WIMAX ROAMING

(75) Inventor: Rainer Liebhart, Munchen (DE)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 12/678,563

(22) PCT Filed: Sep. 17, 2008

(86) PCT No.: PCT/EP2008/062349
§ 371 (c)(1),
(2), (4) Date: Mar. 17, 2010

(87) PCT Pub. No.: WO2009/037275
PCT Pub. Date: Mar. 26, 2009

(65) Prior Publication Data
US 2010/0208659 A1    Aug. 19, 2010

(30) Foreign Application Priority Data
Sep. 18, 2007  (EP) .................................... 07018308

(51) Int. Cl.
*H04L 12/28* (2006.01)
(52) U.S. Cl. ....................................................... 370/401
(58) Field of Classification Search ........................ None
See application file for complete search history.

(56) References Cited

U.S. PATENT DOCUMENTS
2008/0130637 A1*  6/2008  Kant et al. .................... 370/389
2008/0273496 A1*  11/2008  Wu ............................... 370/331
2009/0073995 A1*  3/2009  Pandey et al. ................ 370/401

FOREIGN PATENT DOCUMENTS
WO    2007/068640    6/2007
WO    2007/070446    6/2007

OTHER PUBLICATIONS

Riegel Max: "WiMAX Networking Implications for IETF 16ng" WiMAX Forum Presentation, Mar. 19, 2007.
3rd Generation Partnership Project: GPRS enhancements for E-UTRAN access (release 8), Jul. 2007, http://www.3gpp.org/ftp/Specs/archive/23_series/23.401/23401-110.zip>section 4.2.2.
"Neues zentrales Netzelement CSN Gateway in der WiMAX-Netzarchitektur" IP.COM Journal, Aug. 25, 2007.
IIEEE Standard for Local and Metropolitan Area Networks, Part 16: Air Interface for Fixed and Mobile Broadband Wireless Access Systems; Amendment 2: Physical and Medium Access Control Layers for Combined Fixed and Mobile Operation in Licensed Bands and Corrigendum 1; IEEE Std 802.16e 2005, 864 pages.

* cited by examiner

*Primary Examiner* — Raj Jain
(74) *Attorney, Agent, or Firm* — Squire, Sanders (US) LLP

(57) ABSTRACT

A home agent is configured to be placed in a visited connectivity service network and configured to provide a possibility of a local break out of data. The home agent is configured to separate a first data traffic path and a second data traffic path. The first data traffic path is directly routed between the visited connectivity service network and the internet, and the second data traffic path is routed between the visited connectivity service network and a home connectivity service network, in order to minimize a number of hops and delay times. The home agent is configured to receive a routing policy from a home authentication, authorization and accounting server. The home agent is configured to route data traffic based on the received routing policy.

20 Claims, 2 Drawing Sheets

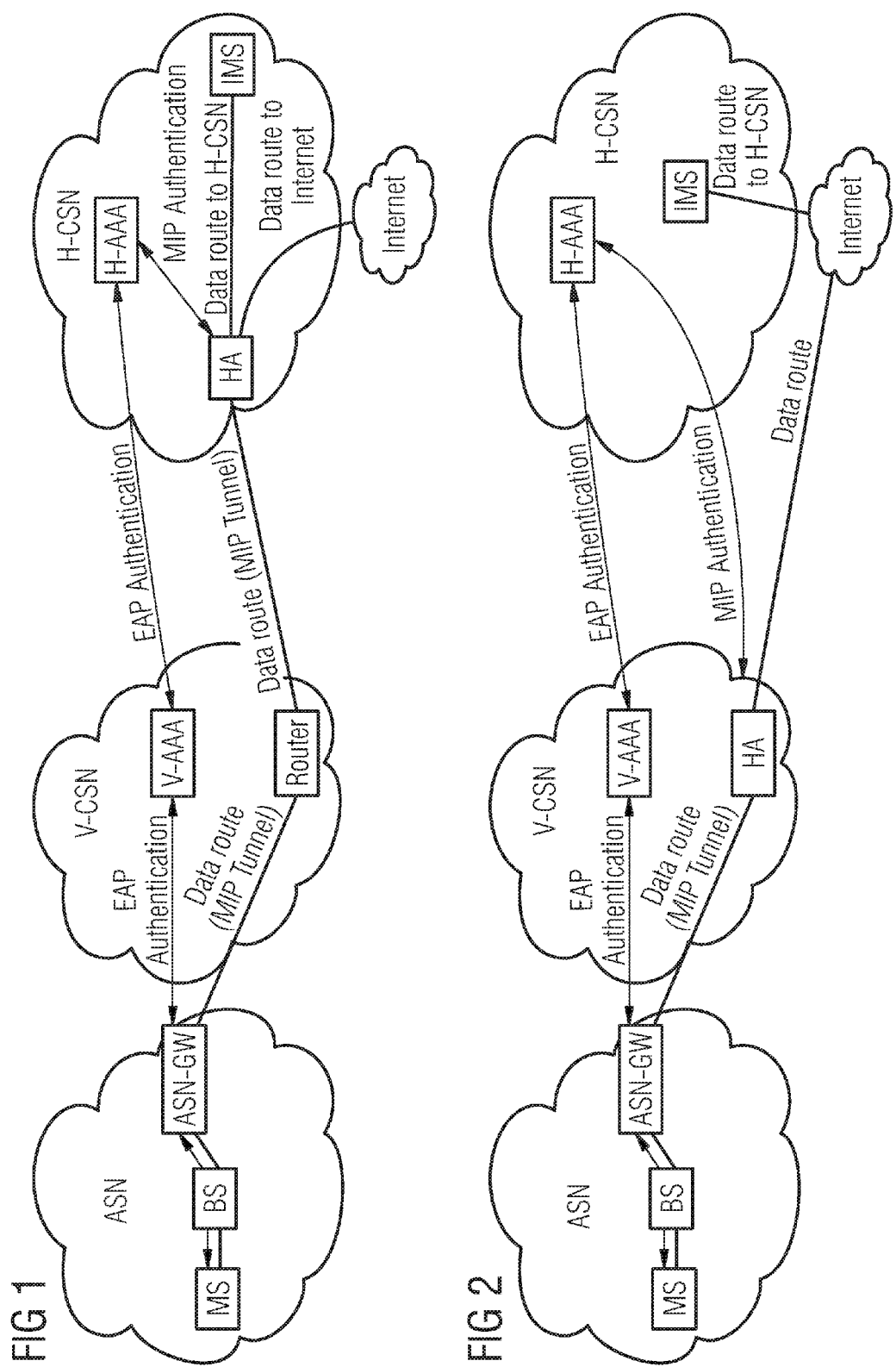

LOCAL BREAK OUT IN CASE OF WIMAX ROAMING

RELATED APPLICATIONS

The present application claims the benefit of the filing date of European Patent Application No. 07018308.2 filed Sep. 18, 2007 and of PCT-Application No. PCT/EP2008/062349 filed Sep. 17, 2008, the disclosures of which are hereby incorporated herein by reference.

FIELD OF THE INVENTION

The present invention relates to an architecture, in particular a home agent being placed in a visited connectivity service network in order to separate a data traffic path to a home connectivity service network and a data traffic path to the internet in order to minimise a number of hops and delay times.

BACKGROUND OF THE INVENTION

In the Worldwide Interoperability for Microwave Access (WiMAX) Forum, network reference architectures based on the IEEE802.16e broadband wireless access technology are defined. The WiMAX standard defines beside an access service network (ASN), a connectivity service network (CSN). The access service network comprises, for example, a base station (BS), in particular a radio base station and an access service network gateway (ASN-GW). The connectivity service network provides services like authentication, authorisation and accounting (AAA), dynamic host configuration protocol (DHCP) and a mobile internet protocol home agent (MIP HA). The home agent usually also constitutes an internet protocol router. Via the connectivity service network a terminal, for example, a mobile station (MS) or a subscriber station (SS) may have an access to the internet or to services which are specific for the respective operator, like, for example, an internet protocol multimedia subsystem (IMS).

A WiMAX roaming architecture comprises, for example, an access service network, a visited connectivity service network (V-CSN) and a home connectivity service network (H-CSN). In case of roaming, the access service network is connected to the visited connectivity service network, but not to the home connectivity service network. However, usually in the home connectivity service network the user specific data is managed, but not in the visited connectivity service network. Therefore, if a terminal or a mobile station accesses to an access service network, the mobile station will be authenticated by an authentication, authorisation and accounting server of the home connectivity service network, the home authentication, authorisation and accounting (H-AAA) server. In this case the authentication, authorisation and accounting server in the visited connectivity service network, the visited AAA (V-AAA) server only serves as an AAA proxy server. WiMAX uses for authentication an extensible authentication protocol (EAP) which may be transported within the AAA protocol corresponding to RADIUS OR DIAMETER. According to the WiMAX standard, the user data will be transported between the access service network and the connectivity service network in a mobile internet protocol (MIP) tunnel. The MIP home agent will be localised in the connectivity service network. During the MIP registration an authentication of the subscriber with the home AAA server takes place, which home AAA server also provides the key or key material to the home agent during authentication. The protocol between the home agent and the home AAA server is, again, RADIUS OR DIAMETER. In case of roaming, the WiMAX standard defines that the home agent is provided either in the home connectivity service network or in the visited connectivity service network. In case the home agent is provided in the home connectivity service network, the home agent address may be provided from the home AAA server to the access service network during the EAP authentication phase. In case the home agent is provided in the visited connectivity service network, the visited AAA server inserts the local home agent address in the AAA signalling to the access service network, owing to the provision of the home agent in the visited connectivity service network.

SUMMARY OF THE INVENTION

There may be a need to provide a method and a device for a local break out of data, in order to avoid a diversion of data traffic between the internet and the visited connectivity service network via the home connectivity service network.

The invention provides a device and a method for a local break out of data, a corresponding programme element and a computer readable medium according to the subject matter of the independent claims. Further embodiments are incorporated in the dependent claims.

It should be noted that the following described exemplary embodiments of the invention apply also for the method, the device, the programme element and the computer readable medium.

According to an exemplary embodiment of the invention, there is provided a home agent, which home agent being adapted to be placed in a visited connectivity service network, and which home agent being adapted to separate a first data traffic path and a second data traffic path, wherein the first data traffic path is routed between the visited connectivity service network and the internet, and the second data traffic path is routed between the visited connectivity service network and a home connectivity service network, in order to minimise a number of hops and delay times.

Thus, the home agent being placed in a visited connectivity service network provides the possibility of a local break out of data, so that it may be avoided to divert the internet traffic via the home connectivity service network, and to provide the break out to the internet in the home connectivity service network. In other words, by providing an inventive home agent in the visited connectivity service network, the internet traffic may be directly routed between the visited connectivity service network and the internet without the need to carry out a further hop via the home connectivity service network, which further hop would cause a further timely delay. Thus, those networks of the operators do not have to manage a data traffic to or from the internet, whose data traffic is not dedicated to the concerning networks. Further, the routing of internet protocol packets may be optimised, in particular when the access service network and the visited connectivity service network are located in a country being different from that country in which the home connectivity service network is located, i.e. in case of international roaming. Thus, the present invention provides for a device being capable of separating a data traffic for a local break out. The visited connectivity service network, in particular the home agent being provided in the visited connectivity service network decides which internet protocol packet is to be routed directly into the internet, and which internet protocol packet is to be routed into the home connectivity service network, either directly or via an own network connecting the connectivity service networks.

According to an exemplary embodiment of the invention, the first data traffic path and the second data traffic path are to be routed between the visited connectivity service network and an access service network.

This allows providing a data communication between, for example, a mobile station or a subscriber station accessing to the access service network and the internet, as well as a connection between the access service network and the home connectivity service network, wherein the respective data traffic is separated in the home agent provided in the visited connectivity service network.

According to an exemplary embodiment of the present invention, the traffic is routed to or from an internet protocol multimedia subsystem of the home connectivity service network.

According to an exemplary embodiment of the invention, the home agent has therein a configured internet protocol route to a connectivity service network, wherein the home agent is adapted to route data traffic based on the configured internet protocol route.

Thus, the home agent may, for example, separate the first and second data traffic path based on information stored in the home agent, for example, in a list or a look up table. The home agent may, for example, check the internet protocol address of a data packet to determine the destination of the respective internet protocol packet and may route packets having an address which is intended to be routed to the home connectivity service network to the home connectivity service network, i.e. without detention via the internet.

According to an exemplary embodiment of the invention, the internet protocol route is a static internet protocol route.

Thus, the allocation of the internet protocol packets and the respective routing is carried out in a pre-determined manner, without the need for a dynamic adoption or update.

According to an exemplary embodiment of the invention, the home agent is adapted to route data traffic, which is not routed to a connectivity service network, by default to the internet.

Thus, the volume of data representing the internet protocol route may be reduced, since only those addresses have to be stored which correspond to the respective connectivity service network, wherein in absence of an internet protocol packet address in, for example, the look up table, by default the internet protocol packet is routed to the internet. It should be noted that the data traffic to a connectivity service network also may be tunnelled, for example, via an L2TP or IPSec tunnel, depending on the contracts between the respective roaming partners.

According to an exemplary embodiment of the invention, the home agent is adapted to receive a routing policy from a home authentication, authorisation and accounting server, wherein the home agent is adapted to route data traffic based on the received routing policy.

Thus, during the mobile internet protocol authentication between the home agent and the home AAA server in the home connectivity service network, routing policies may be submitted from the home AAA server to the home agent, so that the home agent may use the received routing policies for the routing procedure, i.e. to route the internet protocol packets according to the received rules towards the correct corresponding destination. A mobile internet protocol authentication may be carried out during a mobile internet protocol registration and may serve to authenticate the subscriber and the mobile internet protocol specific key material to be submitted from the home AAA server to the home agent. It should be noted that "during" also means a short time before or after, or a totally or partially timely overlapping.

According to an exemplary embodiment of the invention, the home agent is adapted to associate a subscriber station internet protocol address and a foreign agent internet protocol address.

Thus, during mobile internet protocol registration, the internet protocol address of a subscriber station may be related to a foreign agent address in the home agent. The foreign agent may be implemented on the access service network gateway.

According to an exemplary embodiment of the invention, the routing policy comprises an internet protocol address or address range, wherein the address or address range being associated with a home connectivity service network, and wherein the home agent is adapted to route data traffic having a destination address of the home connectivity service network to or from the home connectivity service network.

Thus, the routing policy or routing policies provide for an internet protocol address or address range being managed by the home connectivity service network in order to serve as a base to route internet protocol packets having a destination address being included in the aforementioned address range from the home agent to the home connectivity service network.

According to an exemplary embodiment of the invention, the home agent is adapted to receive a key and to establish a secure data traffic route to or from the home connectivity service network.

Thus, the traffic to the home connectivity service network may, for example, be carried out in a tunnel, for example, an internet protocol security tunnel, in order to provide a secure connection between the visited connectivity service network and the home connectivity service network, for example, for the submission of sensitive data like, e.g., bank account access data, etc. It should be noted that it may be necessary to provide a key to the home agent in order to build up a secure connection to the home connectivity service network. The routing policy may, for example, be submitted as a separate attribute in the RADIUS or DIAMETER 'access-accept' message of the mobile internet protocol authentication to the home agent.

According to an exemplary embodiment of the invention, the home agent is adapted to dynamically adapt the routing policy during mobile internet protocol authentication.

According to an exemplary embodiment of the invention, the home agent is adapted to dynamically adapt the routing policy separately for each operator domain, for example, an internet or home connectivity service network domain.

Thus, it is possible to change dynamically the structure for authentication based on changed requirements of the home connectivity service network. If, for example, home connectivity service networks of different subscriber stations use overlapping internet protocol address ranges, it may be necessary to provide for routing policies in the home agent, which are individual for each operator of a domain, so that the requirements may be adapted to each of the several subscriber stations. Further, this may provide access control lists in the home agent in order to route particular data traffic of a subscriber station from a particular domain to a certain gateway or through a pre-configured tunnel. Since the number of domains, as well as the number of internet protocol address ranges is limited, the home agent does not have to store large routing tables or access control lists.

According to an exemplary embodiment of the invention, there is provided a visited connectivity service network having implemented therein an inventive home agent, as previously described.

According to an exemplary embodiment of the invention, there is provided a method for separating data traffic in a home agent comprising separating in a home agent, which home agent being located in a visited connectivity service network, a first data traffic path and a second data traffic path, wherein the first data traffic path is routed between the visited connectivity service network and the internet, and the second data traffic path is routed between the visited connectivity service network and a home connectivity service network, in order to minimise the number of hops and delay times.

According to an exemplary embodiment of the invention the method may further comprise associating a subscriber station (SS) internet protocol address and a foreign agent (FA) internet protocol address.

According to an exemplary embodiment of the invention in relation to the method it may be foreseen that the routing policy comprises an internet protocol address or address range, the address or address range being associated to a home connectivity service network (H-CSN), and the method further comprising routing data traffic having a destination address of the home connectivity service network (H-CSN) to or from the home connectivity service network (H-CSN).

According to an exemplary embodiment of the invention the method may further comprise receiving a key and establishing a secure data traffic route path to or from the home connectivity service network (H-CSN).

According to an exemplary embodiment of the invention the method may further comprise dynamically adapting the routing policy during a mobile internet protocol (MIP) authentication.

According to an exemplary embodiment of the invention in relation to the method it may be foreseen that the routing policy is provided separately for each subscriber station and/or operator domain.

It should be noted that, according to several exemplary embodiments of the invention, the method may have implemented the functions and features which have been described with respect to the home agent device described above. The description of the home agent therefore applies correspondingly to the method, as well as the programme element and the computer readable medium.

According to an exemplary embodiment of the invention, there is provided a programme element, which, when being executed by a processor, is adapted to carry out the inventive method.

According to an exemplary embodiment of the invention, there is provided a computer readable medium having stored the inventive programme element.

It should be noted that the above features may also be combined. The combination of the above features may also lead to synergetic effects, even if not explicitly described in detail.

These and other aspects of the present invention will be apparent from and elucidated with reference to the embodiments described hereinafter.

BRIEF DESCRIPTION OF THE DRAWINGS

Exemplary embodiments of the invention will be described in the following with reference to the following drawings.

FIG. 1 illustrates a WiMAX roaming scenario, where a home agent is provided in a home connectivity service network.

FIG. 2 illustrates a WiMAX roaming scenario, where the home agent is provided in a visited connectivity service network.

DETAILED DESCRIPTION OF EXEMPLARY EMBODIMENTS

Figure 3:
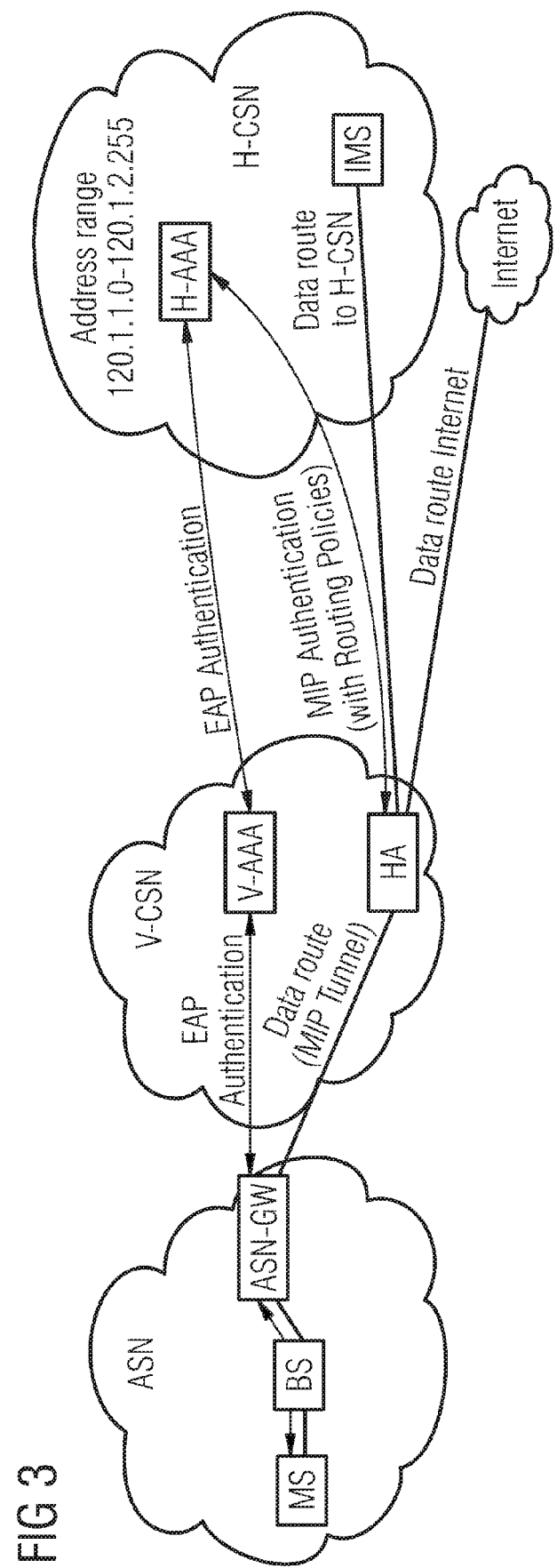
FIG. 3 illustrates a WiMAX roaming scenario with a local break out, where a home agent is provided in a visited connectivity service network.

FIG. 1 illustrates a WiMAX roaming scenario, in which the home agent is located in the home connectivity service network. A mobile station (MS) may access an access service network (ASN) via a base station (BS) and an access service network-gateway (ASN-GW). The ASN gateway carries out an extended authentication protocol authentication to a visited authentication, authorising and accounting server (V-AAA) in a visited connectivity service network (V-CSN), wherein the visited AAA server further carries out an extensible authentication protocol (EAP) authentication to a home AAA server in a home connectivity service network. A home agent being provided in a home connectivity service network receives during mobile internet protocol authentication a key to build up a data transmission connection between the access service network and the home connectivity service network, in particular the home agent. The data transport path for carrying out a routing of a data transport will be established from the home agent in the home connectivity service network to the mobile station (MS) via a router in the visited connectivity service network, the access service network gateway (ASN-GW) and the base station (BS). The data path may be provided as a mobile internet protocol (MIP) tunnel.

The home agent (HA) in the home connectivity service network (H-CSN) will provide data to the home connectivity service network via a data transport path to an internet protocol multimedia subsystem (IMS). The home agent further establishes a data transport path to the internet, wherein the internet is a separate network from the home connectivity service network. This roaming scenario being illustrated in FIG. 1 is called R3 roaming, in which the home agent in the home connectivity service network routes internet protocol packets into the internet or into the home connectivity service network, in particular the IMS.

FIG. 2 illustrates a WiMAX roaming scenario, wherein the home agent is provided in the visited connectivity service network. The configuration of the access service network is the same as already described with respect to FIG. 1. Also the EAP authentication via a visited AAA server in the visited connectivity service network to the home AAA server and the home connectivity service network is the same as already described with respect to FIG. 1. FIG. 2 illustrates an architecture, in which the home agent is provided in the visited connectivity service network (V-CSN), and the MIP authentication is carried out between the home AAA server in the home connectivity service network and the home agent (HA) in the visited connectivity service network. Based thereon, the home agent establishes a data transport path between the mobile station (MS) and the access service network (ASN) via the base station (BS) and the ASN-gateway (ASN-GW) via the home agent to the internet. It should be noted that the architecture described with respect to FIG. 2 provides a home agent, which routes all data packets into the internet, wherein the internet protocol packets being intended to be routed to the home connectivity service network are first routed to the internet and then routed to the home connectivity service network, in particular the IMS in the home connectivity service network. This roaming scenario is a so called R5 roaming.

FIG. 3 illustrates a WiMAX roaming scenario with a local break out, where the home agent (HA) is provided in the visited connectivity service network (V-CSN). The configuration of the access service network (ASN) is the same as already described with respect to FIG. 1.

Also the EAP authentication from the access service network to the home AAA server of the home connectivity service network (H-CSN) via the visited AAA server of the visited connectivity service network is the same as already described with respect to FIG. 1. The home agent (HA) in the visited connectivity service network provides a data transport path between the visited connectivity service network (V-CSN) and the access service network (ASN), wherein this data transport path may be an MIP tunnel. The home agent (HA) in the visited connectivity service network receives from the home AAA server of the home connectivity service network during, for example, the MIP authentication, a routing policy or routing policies. It should be noted that the reception of the routing policy is not mandatory timely during the MIP authentication, and that the term 'during' should be understood as coupled with the MIP authentication. This means that the reception of the routing policy does not have to be fully covered by the time required for the MIP authentication, and may also be carried out, at least partially, before or after the MIP authentication.

The home agent is adapted to carry out a separation of the data traffic path to the home connectivity service network and the internet, namely based on information stored in the home agent. This information may be, for example, static, however, may also be dynamically adapted by successively receiving routing policies from the home AAA server in the home connectivity service network. Based on this information, which information may be the routing policies, the data traffic paths may be separated so that the home agent may provide internet protocol packets having an address corresponding to an address or address range of the home connectivity service network to the home connectivity service network, in particular to the IMS in the presently illustrated architecture. The data traffic path may be carried out on an L2TP or IPSec tunnel between the home agent and the H-CSN.

If, for example, the home connectivity service network includes the address range 120.1.1.0 to 120.1.2.255, the home agent will route internet protocol packets having an address being included in this address range as a destination address to the home connectivity service network, for example, via an L2TP or IPSec tunnel or via a further intermediate network. The home agent thus may have stored the address range of the home connectivity service network of 120.1.1.0 to 120.1.2.255. However, the home agent may also have stored a further address range, for example, 162.1.0.0 to 162.1.0.255, which corresponds to an address range of a further connectivity service network. Thus, if receiving an internet protocol packet having an address included in the address range of the home connectivity service network, the home agent will route the packet to the home connectivity service network. If receiving an internet protocol packet having an address being included in the address range of a further connectivity service network, the home agent will route the internet protocol packet to the other connectivity service network, wherein, for example, internet protocol packets with all remaining addresses will be generally routed to the internet. It should be noted that the home agent thus may have included a plurality of address ranges of different connectivity service networks. These address ranges may also overlap so that if an IP packet having an address being included in the overlapping range, this IP packet will be routed to the connectivity service network the mobile or subscriber station is subscribed to.

For the method, which may be carried out by the home agent, during an MIP authentication between the home agent and the home AAA server, a routing policy or routing policies are submitted from the home AAA server to the home agent, so that the home agent may use the routing policy for the further routing process. The routing process may be carried out based on the routing policy, in order to forward the internet protocol packets to the intended destination. The MIP authentication may be carried out during the MIP registration, and may serve to authenticate the subscriber station and to provide the subscriber station with MIP specific key material, which key material is submitted from the home AAA server to the home agent. It should be noted that the MIP authentication may be also carried out during a time before or after registering or overlapping with the time for registration.

By the MIP registration, in the home agent the IP address of the subscriber station will be related to the foreign agent address. The foreign agent (FA) may be implemented on the access service network gateway (ASN-GW).

In a very simple case, the routing policy includes the IP address ranges being managed by the home connectivity service network (H-CSN). IP packets having a destination address being included in the above mentioned address range, are therefore to be routed from the home agent to the home connectivity service network. If an internet protocol packet address is included in the address range being managed by the home connectivity service network, the respective internet protocol packet is routed to a gateway having the respective address in the home connectivity service network. The data traffic may also be carried out in a tunnel for sake of security. In this case, further keys have to be submitted to the home agent in order to establish a safe connection to the home connectivity service network. Since the routing policy may be provided by the respective home AAA server, the volume of the information to be submitted is limited and the values may be changed dynamically at an MIP authentication by the home connectivity service network. If the home connectivity service networks of different subscriber stations use overlapping IP address ranges, the routing policies in the home agent have to be provided in the home agent for each mobile or subscriber station and each operator domain, wherein such a domain may be the internet or a connectivity service network. Thus, in the home agent access control lists (ACL) may be created and built up, which ACL determine that the data traffic of a subscriber station from a particular domain has to be routed to a particular gateway or by a pre-configured tunnel.

If providing routing policies dynamically from the home connectivity service network to the visited connectivity service network, in particular to the home agent in the visited connectivity service network, a static establishment of a plurality of different rules in the home agent may be avoided. If changing the address ranges in the home connectivity service network, it may further be avoided to instruct all roaming partners (visited connectivity service networks) in order to adapt the configuration. This may be carried out automatically during the next MIP authentication of a subscriber station.

Overlapping address ranges in the home connectivity service network or different subscriber stations may be supported by the use of tunnels (VPN technologies).

It should be noted that the term 'comprising' does not exclude other elements or steps and the 'a' or 'an' does exclude a plurality. Also elements described in association with the different embodiments may be combined.

It should be noted that the reference signs in the claims shall not be construed as limiting the scope of the claims.

The invention claimed is:

1. A home agent wherein:
the home agent being configured to be placed in a visited connectivity service network and configured to provide a possibility of a local break out of data, wherein the home agent is configured to separate a first data traffic path and a second data traffic path, wherein the first data traffic path is directly routed between the visited connectivity service network and the internet, and the second data traffic path is routed between the visited connectivity service network and a home connectivity service network, in order to minimize a number of hops and delay times, wherein the home agent is configured to receive a routing policy from a home authentication, authorization and accounting server, and the home agent is configured to route data traffic based on the received routing policy.

2. The home agent of claim 1, wherein the first data traffic path and second data traffic path are to be routed between the visited connectivity service network and an access service network.

3. The home agent of claim 1, wherein the data traffic is routed to or from an internet protocol multimedia subsystem of the home connectivity service network.

4. The home agent of claim 1, wherein the home agent has therein a configured internet protocol route to a connectivity service network, wherein the home agent is configured to route the data traffic based on said configured internet protocol route.

5. The home agent of claim 4, wherein the internet protocol route is a static internet protocol route.

6. The home agent of claim 1, wherein the home agent is configured to route data traffic, which is not routed to a connectivity service network, by default to the internet.

7. The home agent of claim 1, wherein the home agent is configured to associate a subscriber station internet protocol address and a foreign agent internet protocol address.

8. The home agent of claim 1, wherein the routing policy comprises an internet protocol address or address range, the address or address range being associated to the home connectivity service network, and wherein the home agent is configure to route data traffic having a destination address of the home connectivity service network to or from the home connectivity service network.

9. The home agent of claim 1, wherein the home agent is configured to receive a key and to establish a secure data traffic route to or from the home connectivity service network.

10. The home agent of claim 1, wherein the home agent is configured to dynamically adapt the routing policy during mobile internet protocol authentication.

11. The home agent of claim 1, wherein the home agent is configured to dynamically adapt the routing policy separately for each subscriber station and/or operator domain.

12. A visited connectivity service network having implemented therein the home agent of claim 1.

13. A method for separating data traffic in a home agent, comprising:
separating, in a home agent, a first data traffic path and a second data traffic path, the home agent being located in a visited connectivity service network and configured to provide a possibility of a local break out of data, wherein the first traffic path is directly routed between the visited connectivity service network and the internet, and the second data traffic path is routed between the visited connectivity service network and a home connectivity service network, in order to minimize a number of hops and delay times, wherein the home agent receives a routing policy from a home authentication, authorization and accounting server, the home agent routing data traffic based on the received routing policy.

14. The method of claim 13, wherein the first data traffic and second data traffic path are to be routed between the visited connectivity service network and an access service network.

15. The method of claim 13, further comprising routing data traffic to or from an internet protocol multimedia subsystem in the home connectivity service network.

16. The method of claim 13, further comprising configuring of an internet protocol route to a connectivity service network in the home agent, and routing data traffic based on said configuring of an internet protocol route.

17. The method of claim 16, wherein the internet protocol route is a static internet protocol route.

18. The method of claim 13, wherein data traffic, which is not routed to or from the connectivity service network, by default is routed to or from the internet.

19. A program element, which, when being executed by a processor, is configured to carry out the method of claim 13.

20. A computer readable medium having stored the program element of claim 19.

* * * * *

UNITED STATES PATENT AND TRADEMARK OFFICE
CERTIFICATE OF CORRECTION

PATENT NO. : 8,416,791 B2
APPLICATION NO. : 12/678563
DATED : April 9, 2013
INVENTOR(S) : Rainer Liebhart It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 204 days.

Signed and Sealed this
Fourth Day of June, 2013

Teresa Stanek Rea
*Acting Director of the United States Patent and Trademark Office*